United States Patent
Eom

(10) Patent No.: US 9,727,297 B2
(45) Date of Patent: Aug. 8, 2017

(54) DUAL ORGANIC LIGHT-EMITTING DIODE DISPLAY AND HEAD MOUNT DISPLAY ELECTRONIC DEVICE HAVING THE SAME

(71) Applicant: Samsung Display Co., Ltd., Yongin, Gyeonggi-Do (KR)

(72) Inventor: Ki-Myeong Eom, Suwon-si (KR)

(73) Assignee: Samsung Display Co., Ltd., Gyeonggi-do (KR)

(*) Notice: Subject to any disclaimer, the term of this patent is extended or adjusted under 35 U.S.C. 154(b) by 199 days.

(21) Appl. No.: 14/626,776

(22) Filed: Feb. 19, 2015

(65) Prior Publication Data

US 2016/0086549 A1   Mar. 24, 2016

(30) Foreign Application Priority Data

Sep. 24, 2014 (KR) .................. 10-2014-0127650

(51) Int. Cl.
*G06F 3/14* (2006.01)
*G09G 3/3275* (2016.01)
(Continued)

(52) U.S. Cl.
CPC ........... *G06F 3/1423* (2013.01); *G09G 3/003* (2013.01); *G09G 3/3233* (2013.01);
(Continued)

(58) Field of Classification Search
CPC .... G09G 3/342; G09G 3/3426; G09G 3/3233; G09G 3/003; G09G 3/3266; G09G 2300/0804; G09G 2300/023; G09G 2300/0861; G09G 2310/0221; G09G 2310/0262; G09G 3/3275; G09G 3/2092; G09G 3/2096; G09G 3/30; G09G 3/3208; G09G 3/3216; G09G 3/3225; G09G 2300/026; G09G 5/18; G02F 1/13336; G06F 3/1423; G06F 3/1431; G06F 3/1438; G06F 3/1446; G06F 3/012; G06F 3/013

See application file for complete search history.

(56) References Cited

U.S. PATENT DOCUMENTS 7,365,730 B2 * 4/2008 Suzuki ................ G02B 6/0063
                                                    345/1.1
2004/0223049 A1 * 11/2004 Taniguchi ............ G06F 3/1423
                                                    348/14.02
(Continued)

FOREIGN PATENT DOCUMENTS

KR   10-2006-0132360 A   12/2006
KR   10-2008-0001496 A   1/2008
(Continued)

*Primary Examiner* — Larry Sternbane
*Assistant Examiner* — Darlene M Ritchie
(74) *Attorney, Agent, or Firm* — Knobbe Martens Olson & Bear LLP

(57) ABSTRACT

A dual display and electronic device having the same are disclosed. In one aspect, the dual display includes first and display panels, first and second data drivers, first and second switches, and a power supply. The second data driver does not operate when a first emission driver disable control signal is transmitted to the second emission driver. The first data driver does not operate when a second emission driver disable control signal is transmitted to the first emission driver.

20 Claims, 10 Drawing Sheets

(51) Int. Cl.
  *G09G 3/00*    (2006.01)
  *G09G 3/3233*  (2016.01)
  *G09G 3/3208*  (2016.01)
  *G09G 3/3266*  (2016.01)

(52) U.S. Cl.
  CPC ......... *G09G 3/3275* (2013.01); *G09G 3/3208* (2013.01); *G09G 3/3266* (2013.01); *G09G 2300/0861* (2013.01); *G09G 2310/0221* (2013.01); *G09G 2310/0262* (2013.01)

(56) References Cited

U.S. PATENT DOCUMENTS

| | | | |
|---|---|---|---|
| 2004/0252076 A1* | 12/2004 | Kodama | G09G 3/3208 345/3.1 |
| 2005/0151702 A1* | 7/2005 | Kirkland | G09G 3/3208 345/1.1 |
| 2006/0284864 A1 | 12/2006 | Woo | |
| 2007/0035473 A1* | 2/2007 | Yamazaki | G02F 1/13318 345/4 |
| 2007/0210982 A1* | 9/2007 | Nakai | G02F 1/1362 345/1.1 |
| 2007/0285413 A1* | 12/2007 | Wong | G06F 1/1601 345/211 |
| 2008/0036386 A1* | 2/2008 | Shin | G09G 3/3225 315/169.3 |
| 2009/0121985 A1* | 5/2009 | Kang | G09G 3/3233 345/82 |
| 2010/0253691 A1* | 10/2010 | Lin | G06F 3/1431 345/520 |
| 2012/0044231 A1* | 2/2012 | Park | G06F 1/263 345/211 |
| 2012/0280962 A1* | 11/2012 | Kawabe | G09G 3/3233 345/211 |
| 2013/0208032 A1* | 8/2013 | Jang | G09G 3/3233 345/694 |
| 2013/0222441 A1* | 8/2013 | Yokoyama | G09G 5/10 345/690 |
| 2013/0241804 A1* | 9/2013 | Yang | G06F 3/1423 345/3.1 |
| 2013/0314338 A1 | 11/2013 | Nam et al. | |
| 2013/0334543 A1* | 12/2013 | Kim | H01L 33/36 257/79 |
| 2014/0092107 A1* | 4/2014 | Ferry | G06T 1/20 345/520 |
| 2014/0285518 A1* | 9/2014 | Tanaka | G02B 27/017 345/632 |
| 2015/0185483 A1* | 7/2015 | Hiraide | G02B 27/0176 359/471 |
| 2015/0187336 A1* | 7/2015 | Yang | G09G 5/18 345/213 |
| 2015/0243202 A1* | 8/2015 | Lombardi | G09G 3/2092 345/520 |
| 2015/0363974 A1* | 12/2015 | Nakai | H04N 13/044 345/419 |

FOREIGN PATENT DOCUMENTS

| | | |
|---|---|---|
| KR | 10-2008-0049563 A | 6/2008 |
| KR | 10-2013-0131749 A | 12/2013 |

* cited by examiner

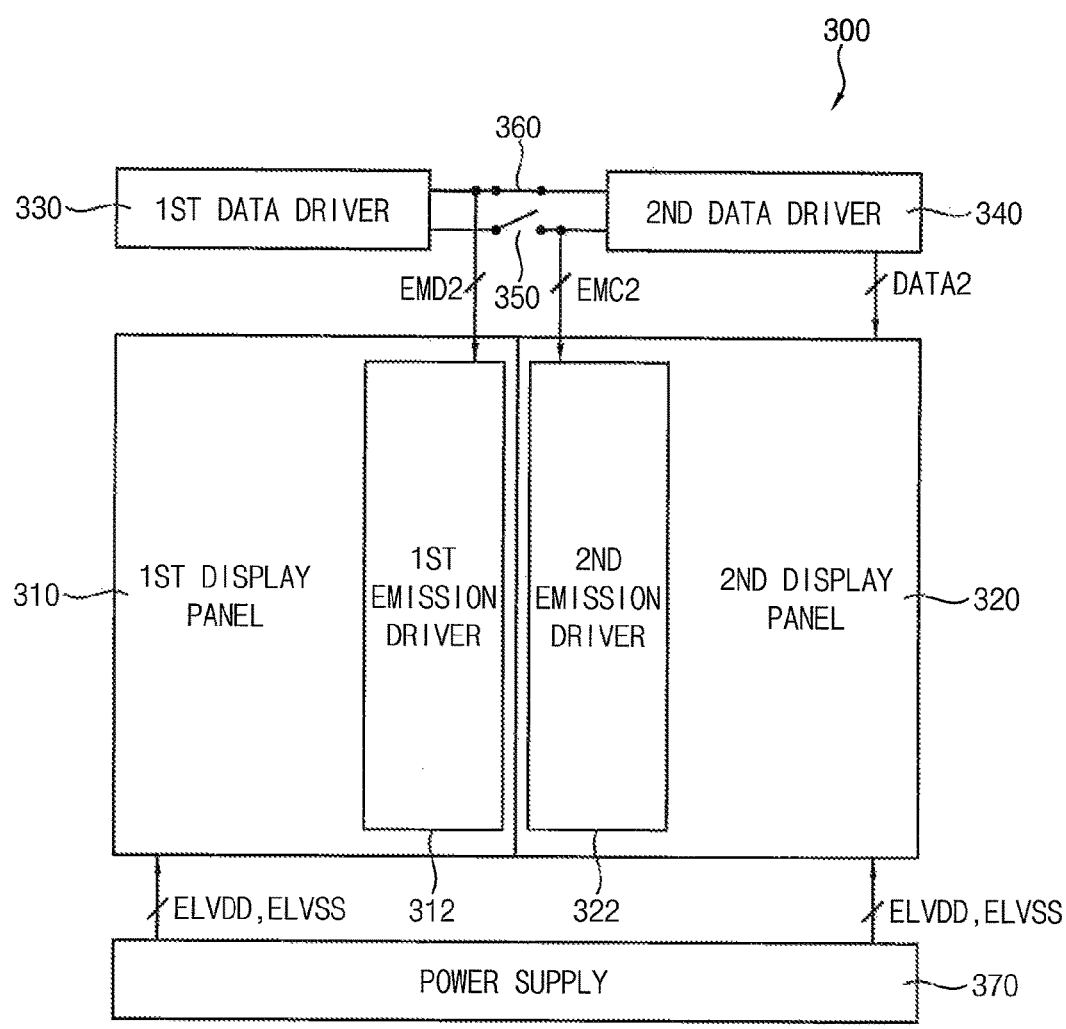

DUAL ORGANIC LIGHT-EMITTING DIODE DISPLAY AND HEAD MOUNT DISPLAY ELECTRONIC DEVICE HAVING THE SAME

CROSS-REFERENCE TO RELATED APPLICATIONS

This application claims priority under 35 USC §119 to Korean Patent Application No. 10-2014-0127650, filed on Sep. 24, 2014 in the Korean Intellectual Property Office (KIPO), the contents of which are incorporated herein in its entirety by reference.

BACKGROUND

Field

The described technology generally relates to a dual display and an electronic device having the dual display.

Description of the Related Technology

Various kinds of electronic devices using a dual display are being developed. As electronic devices using these displays such as head mount displays (HMDs) increase, new driving methods are also being developed.

SUMMARY OF CERTAIN INVENTIVE ASPECTS

One inventive aspect is a dual display that can prevent image defects from occurring on a display panel that is not driven when the other display panel is driven.

Another aspect is a dual display that can include a first display panel including a plurality of first pixels and a first emission driving unit that generates first emission control signals provided to the first pixels, a second display panel including a plurality of second pixels and a second emission driving unit that generates second emission control signals provided to the second pixels, the second display panel being adjacent to the first display panel, a first data driving unit configured to provide a first data signal to the first display panel, to provide a first emission driving unit control signal that controls an operation of the first emission driving unit to the first emission driving unit, and to provide a first emission driving unit disable control signal that controls the second emission driving unit to generate the second emission control signals for controlling the second pixels not to emit light to the second emission driving unit, a second data driving unit configured to provide a second data signal to the second display panel, to provide a second emission driving unit control signal that controls an operation of the second emission driving unit to the second emission driving unit, and to provide a second emission driving unit disable control signal that controls the first emission driving unit to generate the first emission control signals for controlling the first pixels not to emit light to the first emission driving unit, a first switch unit configured to perform a coupling operation between the first emission control driving unit and the second data driving unit, a second switch unit configured to perform a coupling operation between the second emission control driving unit and the first data driving unit, and a power supply unit configured to provide a high power voltage and a low power voltage to the first display panel and the second display panel. The second data driving unit does not operate when the first data driving unit operates, and the first data driving unit does not operate when the second data driving unit operates.

In example embodiments, the first emission driving unit disable control signal is provided to the second emission driving unit by turning on the first switch unit while the first display panel operates in response to the first data signal and the first emission control signal.

In example embodiments, the second emission driving unit disable control signal is provided to the first emission driving unit by turning on the second switch unit while the second display panel operates in response to the second data signal and the second emission control signal.

In example embodiments, each of the first pixels includes an organic light-emitting diode (OLED), a pixel circuit configured to generate a driving current flowing through the OLED, and an emission transistor configured to operate the OLED in response to the first emission control signal provided through an emission control line, the emission transistor being formed between the OLED and the pixel circuit.

In example embodiments, the first emission driving unit includes an emission driving circuit that provides the first emission control signal to the emission transistor through the emission control line.

In example embodiments, each of the second pixels includes an OLED, a pixel circuit configured to generate a driving current flowing through the OLED, and an emission transistor configured to operate the OLED in response to the second emission control signal provided through an emission control line, the emission transistor being formed between the OLED and the pixel circuit.

In example embodiments, the second emission driving unit includes an emission driving circuit that provides the second emission control signal to the emission transistor through the emission control line.

In example embodiments, the first data driving unit outputs a first switch control signal that controls an operation of the first switch unit.

In example embodiments, the second data driving unit outputs a second switch control signal that controls an operation of the second switch unit.

In example embodiments, the dual display is implemented as a head mount display (HMD).

In example embodiments, the head mount display includes a left-eye lens and a right-eye lens.

Another aspect is an electronic that includes a dual display and a processor that controls the dual display. The dual display can include a first display panel including a plurality of first pixels and a first emission driving unit that generates a first emission control signals provided to the first pixels, a second display panel including a plurality of second pixels and a second emission driving unit that generates a second emission control signals provided to the second pixels, the second display panel being adjacent to the first display panel, a first data driving unit configured to provide a first data signal to the first display panel, to provide a first emission driving unit control signal that controls an operation of the first emission driving unit to the first emission driving unit, and to provide a first emission driving unit disable control signal that controls the second emission driving unit to generate the second emission control signals for controlling the second pixels not to emit light to the second emission driving unit, a second data driving unit configured to provide a second data signal to the second display panel, to provide a second emission driving unit control signal that controls an operation of the second emission driving unit to the second emission driving unit, and to provide a second emission driving unit disable control signal that controls the first emission driving unit to generate the first emission control signals for controlling the first pixels not to emit light to the first emission driving unit, a first switch unit configured to perform a coupling operation between the first emission control driving unit and the second data driving unit, a second switch unit configured to perform a coupling operation between the second emission control driving unit and the first data driving unit, and a power supply unit configured to provide a high power voltage and a low power voltage to the first display panel and the second display panel. The second data driving unit does not operate when the first data driving unit operates, and the first data driving unit does not operate when the second data driving unit operates.

In example embodiments, the first emission driving unit disable control signal is provided to the second emission driving unit by turning on the first switch unit while the first display panel operates in response to the first data signal and the first emission control signal.

In example embodiments, the second emission driving unit disable control signal is provided to the first emission driving unit by turning on the second switch unit while the second display panel operates in response to the second data signal and the second emission control signal.

In example embodiments, each of the first pixels includes an OLED, a pixel circuit configured to generate a driving current flowing through the OLED, and an emission transistor configured to operate the OLED in response to the first emission control signal provided through an emission control line, the emission transistor being formed between the OLED and the pixel circuit.

In example embodiments, the first emission driving unit includes an emission driving circuit that provides the first emission control signal to the emission transistor through the emission control line.

In example embodiments, each of the second pixels includes an OLED, a pixel circuit configured to generate a driving current flowing through the OLED, and an emission transistor configured to operate the OLED in response to the second emission control signal provided through an emission control line, the emission transistor being formed between the OLED and the pixel circuit.

In example embodiments, the second emission driving unit includes an emission driving circuit that provides the second emission control signal to the emission transistor through the emission control line.

In example embodiments, the dual display is implemented as a head mount display (HMD).

In example embodiments, the head mount display includes a left-eye lens and a right-eye lens.

Another aspect is a dual display comprising a first display panel including a plurality of first pixels and a first emission driver configured to transmit a plurality of first emission control signals to the first pixels. The display also comprises a second display panel including a plurality of second pixels and a second emission driver configured to transmit a plurality of second emission control signals to the second pixels, wherein the second display panel is adjacent to the first display panel. The display also comprises a first data driver configured to i) transmit a first data signal to the first display panel, ii) transmit a first emission driver control signal to the first emission driver to control the first emission driver, and iii) transmit a first emission driver disable control signal to the second emission driver to control the second pixels to not emit light. The display also comprises a second data driver configured to i) transmit a second data signal to the second display panel, ii) transmit a second emission driver control signal to the second emission driver for controlling the second emission driver, and iii) transmit a second emission driver disable control signal to the first emission driver to control the first pixels to not emit light. The display also comprises a first switch configured to electrically connect the first emission control driver to the second data driver. The display also comprises a second switch configured to electrically connect the second emission control driver to the first data driver. The display also comprises a power supply configured to provide first and second power voltages different from each other to both of the first and second display panels, wherein the second data driver is further configured to not operate when the first emission driver disable control signal is transmitted to the second emission driver, and wherein the first data driver is further configured to not operate when the second emission driver disable control signal is transmitted to the first emission driver.

In the above device, the first switch is configured to be turned on while the first display panel is operating based at least in part on the first data signal and the first emission control signal so as to transfer the first emission driver disable control signal to the second emission driver.

In the above device, the second switch is configured to be turned on while the second display panel is operating based at least in part on the second data signal and the second emission control signal so as to transfer the second emission drive disable control signal to the first emission driver.

In the above device, each of the first pixels includes an organic light-emitting diode (OLED), a pixel circuit configured to generate a driving current flowing through the OLED, and an emission transistor configured to control the OLED based at least in part on the first emission control signal transmitted through an emission control line, wherein the emission transistor is formed between the OLED and the pixel circuit.

In the above device, the first emission driver includes an emission driving circuit configured to transmit the first emission control signal to the emission transistor through the emission control line.

In the above device, each of the second pixels includes an OLED, a pixel circuit configured to generate a driving current flowing through the OLED, and an emission transistor configured to control the OLED based at least in part on the second emission control signal transmitted through an emission control line, wherein the emission transistor is formed between the OLED and the pixel circuit.

In the above device, the second emission driver includes an emission driving circuit configured to transmit the second emission control signal to the emission transistor through the emission control line.

In the above device, the first data driver is further configured to output a first switch control signal to control the first switch.

In the above device, the second data driver is further configured to output a second switch control signal to control the second switch.

In the above device, the dual display includes a head mount display (HMD).

In the above device, the HMD includes a left-eye lens and a right-eye lens.

Another aspect is an electronic device comprising a dual display and a processor configured to control the dual display. The dual display comprises a first display panel including a plurality of first pixels and a first emission driver configured to transmit a plurality of first emission control signals to the first pixels. The display also comprises a second display panel including a plurality of second pixels and a second emission driver configured to transmit a plurality of second emission control signals to the second pixels, wherein the second display panel is adjacent to the first display panel. The display also comprises a first data driver configured to i) transmit a first data signal to the first display panel, ii) transmit a first emission driver control signal to the first emission driver to control the first emission driver, and iii) transmit a first emission driver disable control signal to the second emission driver to control the second pixels to not emit light. The display also comprises a second data driver configured to i) transmit a second data signal to the second display panel, ii) transmit a second emission driver control signal to the second emission driver for controlling the second emission driver, and iii) transmit a second emission driver disable control signal to the first emission driver to control the first pixels to not emit light. The display also comprises a first switch configured to electrically connect the first emission control driver to the second data driver. The display also comprises a second switch configured to electrically connect the second emission control driver to the first data driver. The display also comprises a power supply configured to provide first and second power voltages different from each other to both of the first and second display panels, wherein the second data driver is further configured to not operate when the first emission driver disable control signal is transmitted to the second emission driver, and wherein the first data driver is further configured to not operate when the second emission driver disable control signal is transmitted to the first emission driver.

In the above device, the first switch is configured to be turned on while the first display panel is operating based at least in part on the first data signal and the first emission control signal so as to transfer the first emission driver disable control signal to the second emission driver.

In the above device, the second switch is configured to be turned on while the second display panel is operating based at least in part on the second data signal and the second emission control signal so as to transfer the second emission drive disable control signal to the first emission driver.

In the above device, each of the first pixels includes an organic light-emitting diode (OLED), a pixel circuit configured to generate a driving current flowing through the OLED, and an emission transistor configured to control the OLED based at least in part on the first emission control signal transmitted through an emission control line, wherein the emission transistor is formed between the OLED and the pixel circuit.

In the above device, the first emission driver includes an emission driving circuit configured to transmit the first emission control signal to the emission transistor through the emission control line.

In the above device, each of the second pixels includes an OLED, a pixel circuit configured to generate a driving current flowing through the OLED, and an emission transistor configured to control the OLED based at least in part on the second emission control signal transmitted through an emission control line, wherein the emission transistor is formed between the OLED and the pixel circuit.

In the above device, the second emission driver includes an emission driving circuit configured to transmit the second emission control signal to the emission transistor through the emission control line.

In the above device, the dual display includes a head mount display (HMD) device.

In the above device, the HMD includes a left-eye lens and a right-eye lens.

According to at least one of the disclosed embodiments, a dual display prevents image defects from occurring on a display panel that is not driven by providing a non-emission signal to the display panel that is not driven when the other display panel is driven.

BRIEF DESCRIPTION OF THE DRAWINGS

FIG. 4B is a block diagram illustrating an example of an operation of a second display panel included in the dual display of FIG. 1.

DETAILED DESCRIPTION OF CERTAIN INVENTIVE EMBODIMENTS

Hereinafter, the present inventive concept will be explained in detail with reference to the accompanying drawings. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 1:
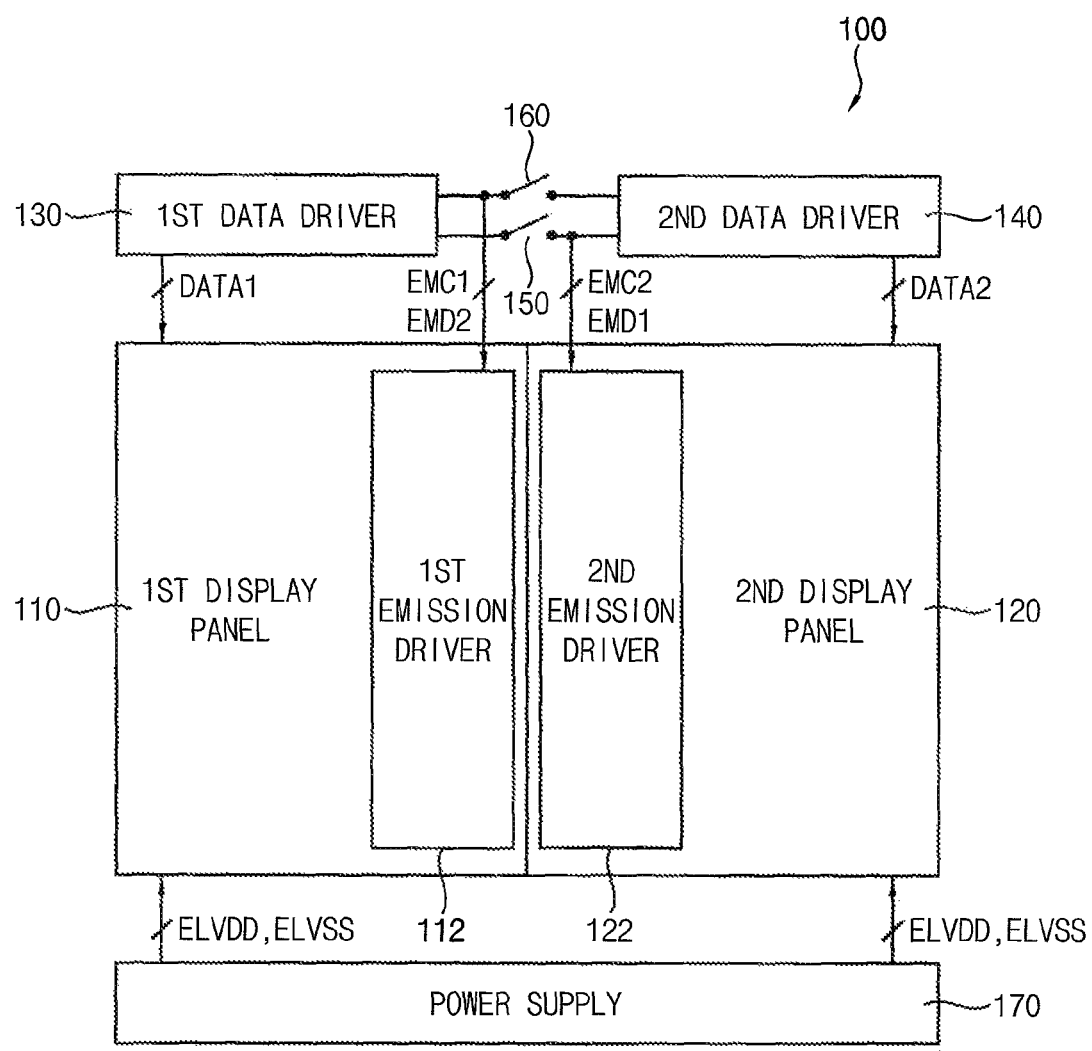
FIG. 1 is a block diagram illustrating a dual display according to example embodiments.
Figure 2A:
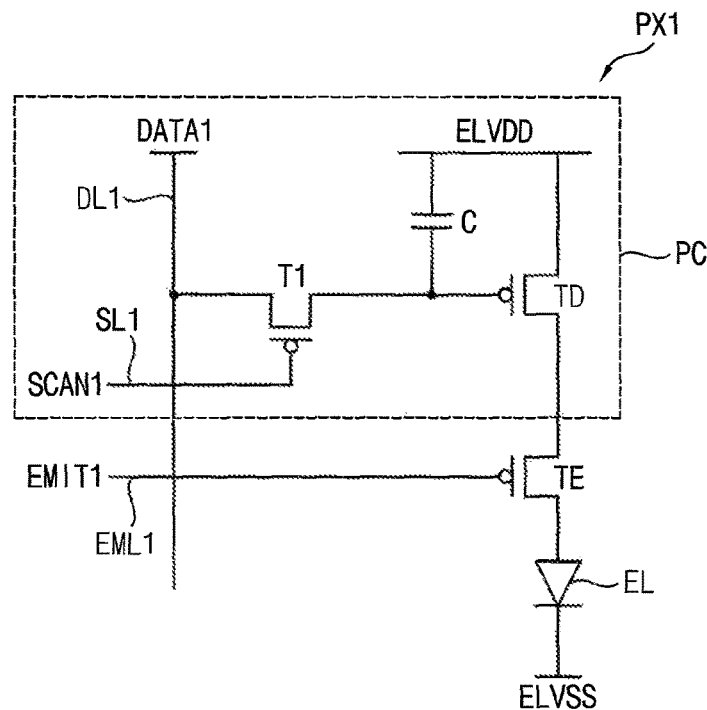
FIG. 2A is a circuit diagram illustrating an example of a first pixel included in the dual display of FIG. 1.
Figure 2B:
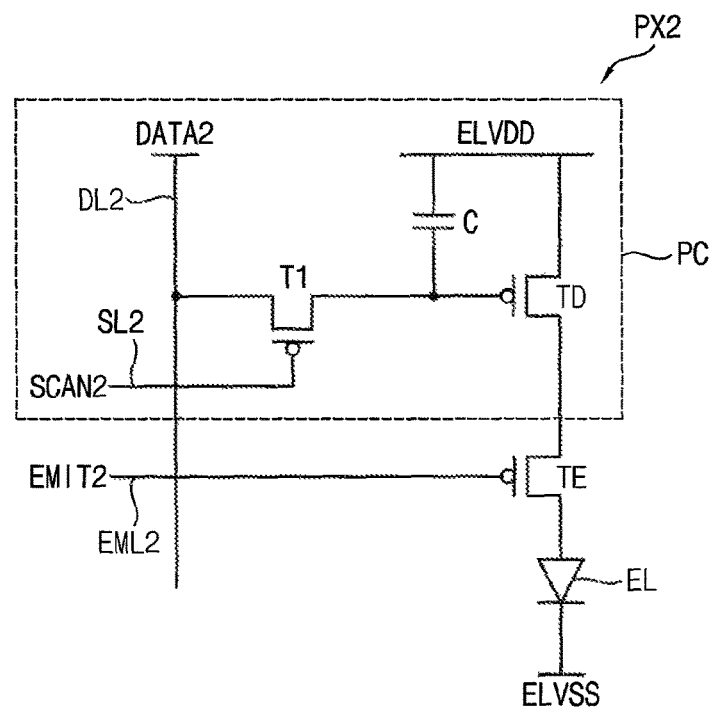
FIG. 2B is a circuit diagram illustrating an example of a second pixel included in the dual display of FIG. 1.

FIG. 1 is a block diagram illustrating a dual display according to example embodiments. FIG. 2A is a circuit diagram illustrating an example of a first pixel included in the dual display 100 of FIG. 1. FIG. 2B is a circuit diagram illustrating an example of a second pixel included in the dual display 100 of FIG. 1.

Referring to FIG. 1, a dual display 100 includes a first display panel 110, a second display panel 120, a first data driving unit or first data driver 130, a second data driving unit or second data driver 140, a first switch unit 150, a second switch unit 160, and a power supply unit 170.

Generally, a dual display including two display panels can receive a power voltage from a power supply unit. Image defects can occur on the second display panel when the first display panel operates because the power voltage is also provided to the second display panel. Further, the image defects can occur on the first display panel when the second display panel operates because the power voltage is also provided to the first display panel. To overcome these problems, the dual display 100 of FIG. 1 provides a signal for controlling the second display panel 120 to not emit light to the second display panel 120 while the first display panel 110 operates. Further, the dual display 100 of FIG. 1 provides a signal for controlling the first display panel 110 to not emit light to the first display panel 110 while the second display panel 120 operates. Thus, the image defects can be improved. Hereinafter, the dual display of FIG. 1 will be described in detail.

The first display panel 110 can include a plurality of first pixels Px1 and a first emission driving unit 112 that generates first emission control signals EMIT1 provided to the first pixels PX1. The first pixels PX1 can be formed in an intersection region of a plurality of first data lines DL1 and a plurality of first scan lines SL1. Referring to FIG. 2A, each of the first pixels PX1 includes an OLED EL, a pixel circuit PC, and an emission transistor TE. The pixel circuit PC can include a switching transistor T1, a storage capacitor C, and a driving transistor TD. In this case, the driving transistor TD of the pixel circuit PC can generate a driving current ID that is provided to the OLED EL based at least in part on a first data signal DATA1, where the first data signal DATA1 is provided via the first data line DL1, in response to a first scan signal SCAN1, where the first scan signal SCAN1 is provided via the first scan line SL1. The emission transistor TE can be formed between the OLED EL and the pixel circuit PC. The emission transistor TE can emit cause the OLED EL to emit light by providing the driving current ID to the OLED EL based at least in part on the first emission control signal EMIT1, where the first emission control signal EMIT1 is provided via the first emission control line EML1.

The first emission driving unit 112 can generate the first emission control signals EMIT1 provided to the first pixels Px1. The first emission driving unit 112 can provide the first emission control signal EMIT1 to the emission transistor TE of the first pixel Px1 through the first emission control line EML1. The first emission driving unit 112 can generate the first emission control signal EMIT1 in response to a first emission driving unit control signal EMC1 provided from the first data driving unit 130. Here, the first emission control signal EMIT1 can control an on/off operation of the emission transistor TE of the first pixel Px. Further, the first emission driving unit 112 can generate the first emission control signal EMIT1 in response to a second emission driving unit disable control signal EMD2 provided from the second data driving unit 140. Here, the first emission control signal EMIT1 that is generated in response to the second emission driving unit disable control signal EMD2 can turn off the emission transistor TE.

The second display panel 120 can include a plurality of second pixels Px2 and a second emission driving unit 122 that generates a second emission control signal EMIT2 provided to the second pixels Px2. The second display panel 120 can be adjacent to the first display panel 110. The second pixels Px2 can be formed in an intersection region of a plurality of data lines DL2 and a plurality of scan lines SL2. Referring to FIG. 2B, each of the second pixels Px2 can include the OLED EL, the pixel circuit PC, and the emission transistor TE. The pixel circuit PC can include a switching transistor T1, a storage capacitor C, and a driving transistor TD. In this case, the driving transistor TD can generate a driving current ID that is provided to the OLED EL based at least in part on a second data signal DATA2, where the second data signal DATA2 is provided via the second data line DL2, based at least in part on a second scan signal SCAN2, where the second scan signal SCAN2 is provided via the second scan line SL2. The emission transistor TE can be formed between the OLED EL and the pixel circuit PC. The emission transistor TE can emit the OLED EL by providing the driving current IC to the OLED EL based at least in part on the second emission control signal EMIT2, where the second emission control signal EMIT2 is provided via the second emission control line EML2.

The second emission driving unit 122 can generate the second emission control signals EMIT2 provided to the second pixels Px2. The second emission driving unit 122 can provide the second emission control signal EMIT2 to the emission transistor TE of the second pixel Px2 through the second emission control line EML2. The second emission driving unit 122 can generate the second emission control signal EMIT2 based at least in part on a second emission driving unit control signal EMC2 provided from the second data driving unit 140. Here, the second emission control signal EMIT2 can control an on/off operation of the emission transistor TE of the second pixel Px2. Further, the second emission driving unit 122 can generate the second emission control signal EMIT2 based at least in part on a first emission driving unit disable control signal EMD1 provided from the first data driving unit 130. Here, the second emission control signal EMIT2 generated based at least in part on the first emission driving unit disable control signal EMD1 can turn off the emission transistor TE of the second pixel Px2.

The first data driving unit 130 can provide the first data DATA1 to the first display panel 110, the first emission driving unit control signal EMC1 that controls an operation of the first emission driving unit 112 to the first emission driving unit 112, and the first emission driving unit disable control signal EMD1 that controls the second emission driving unit 122 to generate the second emission control signals EMIT2 for controlling the second pixels Px2 to not emit light to the second emission driving unit 122. The first data driving unit 130 can convert a first image signal provided from an external system into the first data signal DATA1. The first data driving unit 130 can convert the first image signal into an analog voltage corresponding to a grayscale value of the first image signal, and provide the analog voltage to the first display panel 110 as the first data signal DATA1. The first emission driving unit control signal EMC1 can control the operation of the first emission driving unit 112. The first emission driving unit 112 can generate the first emission control signal EMIT1 that is provided to the emission transistor TE of the first pixel Px1 based at least in part on the first emission driving unit control signal EMC1. While the first display panel 110 operates based at least in part on the first data signal DATA1 and the first emission control signal EMIT1, the second emission driving unit disable control signal EMD2 can be provided to the second emission driving unit 122. The second emission driving unit disable control signal EMD2 can be provided to the second emission driving unit 122. The second emission driving unit disable control signal EMD2 can control the operation of the second emission driving unit 122. The second emission driving unit 122 can generate the second emission control signal EMIT2 that turns off the emission transistor TE of the second pixel Px2 based at least in part on the second emission driving unit disable control signal EMD2.

The second data driving unit 140 can provide the second data signal DATA2 to the second display panel 120, the second emission driving unit control signal EMC2 that controls the operation of the second emission driving unit 122 to the second emission driving unit 122, and the second emission driving unit disable control signal EMD2 that controls the first emission driving unit 112 to generate the first emission control signal EMIT1 for controlling the first pixels Px1 to not emit light to the first emission driving unit 112. The second data driving unit 140 can convert a second image signal provided from an external system into a second data signal DATA2. The second data driving unit 140 can convert the second image signal into an analog voltage corresponding to a grayscale of the second image signal and can provide the analog voltage to the second display panel 120 as the second data signal DATA2. The second emission driving unit control signal EMC2 can control the operation of the second emission driving unit 122. The second emission driving unit 122 can generate the second emission control signal that is provided to the emission transistor TE of the second pixel based at least in part on the second emission driving unit control signal EMC2. While the second display panel 120 operates based at least in part on the second data signal DATA 2 and the second emission control signal EMIT2, the first emission driving unit disable control signal EMD1 can be provided to the first emission driving unit 112. The first emission driving unit disable control signal EMD1 can be provided to the first emission driving unit 112. The first emission driving unit disable control signal EMD1 can control the operation of the first emission driving unit 112. The first emission driving unit 112 can generate the first emission control signal EMIT1 that turns off the emission transistor TE of the first pixel Px1 based at least in part on the first emission driving unit disable control signal EMD1.

In some embodiments, when the first data driving unit 130 operates, the second data driving unit 140 does not operate. Further, in some embodiments, when the second data driving unit 140 operates, the first data driving unit 130 does not operate.

The first switch unit 150 can electrically connect the data driving unit 130 to the second emission driving unit 122. While the first display panel 110 operates based at least in part on the first data signal DATA1 and the first emission control signal EMIT1, the first switch unit 150 can turn on. The first emission driving unit disable control signal EMD1 can be provided to the second emission driving unit 122 through the first switch unit 150. The first switch unit 150 can be controlled by a first switch control signal provided from the first data driving unit 130.

The second switch unit 160 can perform a coupling operation between the second data driving unit 140 and the first emission driving unit 112. While the second display panel operates based at least in part on the second data signal DATA2 and the second emission control signal EMIT2, the second switch unit 160 can turn on. The second emission driving unit disable control signal EMD2 can be provided to the first emission driving unit 112 through the second switch unit 160. The second switch unit 160 can be controlled by a second switch control signal provided from the second data driving unit 140.

The power supply unit 170 can provide a high power voltage ELVDD and a low power voltage ELVSS to the first and second display panels 110 and 120. The power supply unit 170 can substantially simultaneously provide the high power voltage ELVDD and the low power voltage ELVSS to the first and second display panels 110 and 120. When the first display panel 110 does not operate, the high power voltage ELVDD and the low power voltage ELVSS can be provided to the first display panel 110. Further, when the second display panel 120 does not operate, the high power voltage ELVDD and the low power voltage ELVSS can be provided to the second display panel 120.

As described above, the dual display 100 according to the example embodiments prevents the image defect from occurring on the second display panel 120 when the first display panel 110 operates based at least in part on the first data signal DATA1 and the first emission control signal EMIT1 by turning on the first switch unit 150 and by providing the first emission driving unit disable control signal EMD1 to the second display panel 120 through the first switch unit 150. Further, the dual display 100 according to the example embodiments prevents the image defect from occurring on the first display panel 110 when the second display panel 120 operates based at least in part on the second data signal DATA2 and the second emission control signal EMIT2 by turning on the second switch unit 160 and by providing the second emission driving unit disable control signal EMD2 to the first display panel 110 through the second switch unit 160.

Figure 3A:
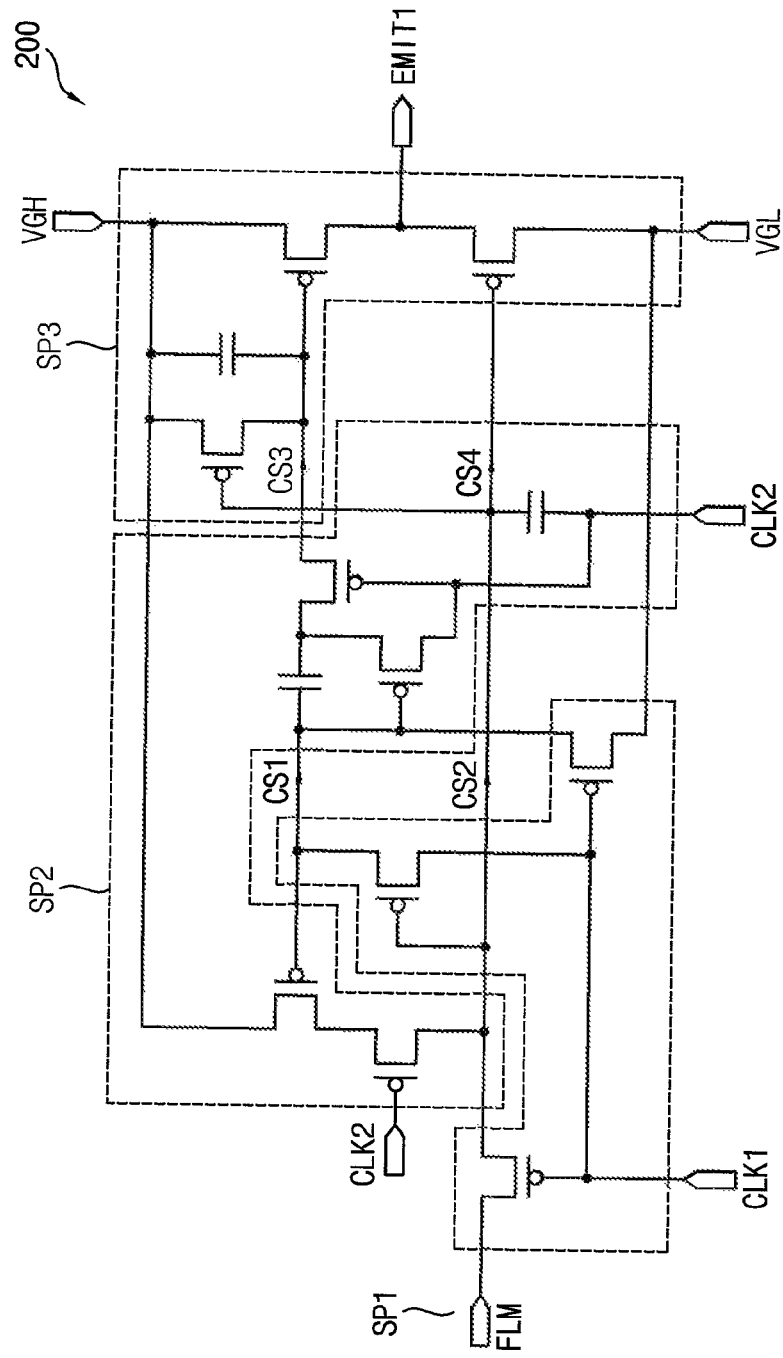
FIG. 3A is a block diagram illustrating an example of a first emission driving circuit included in the dual display of FIG. 1.
Figure 3B:
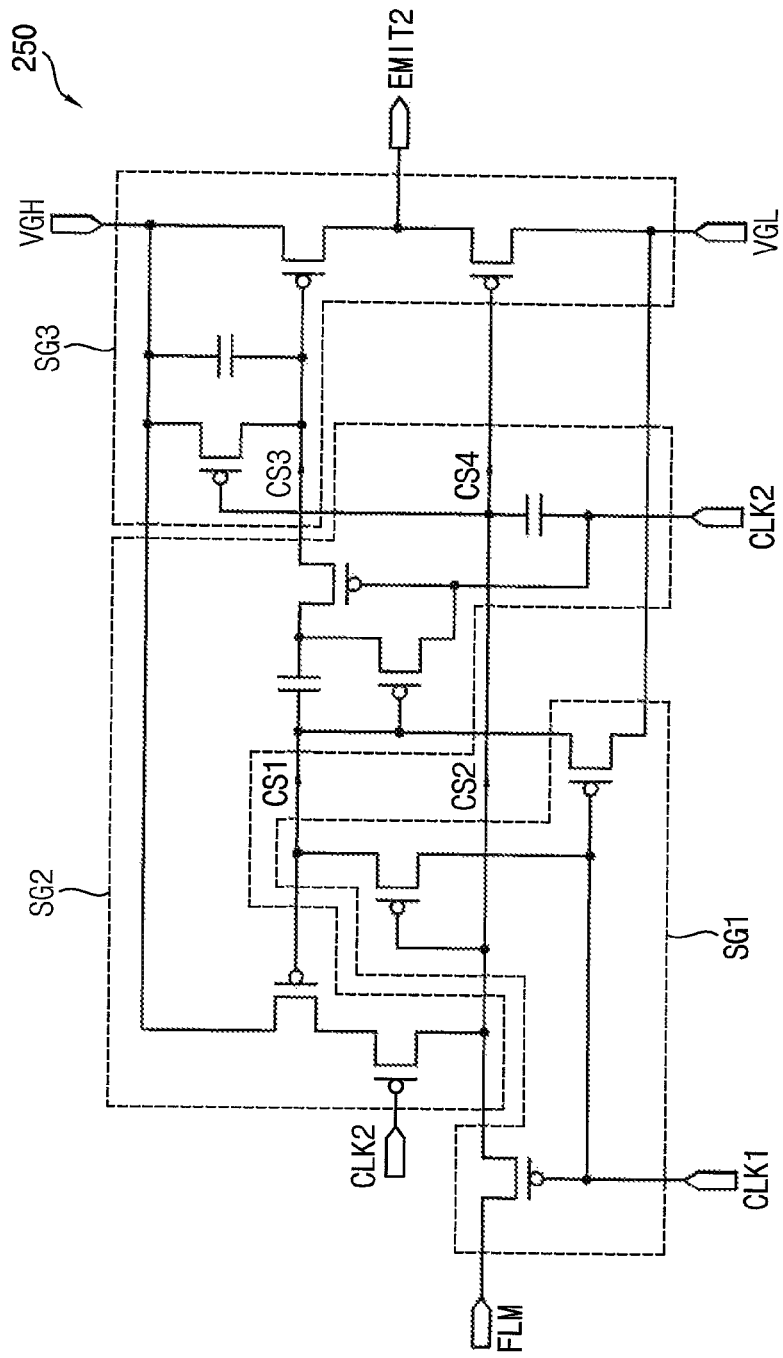
FIG. 3B is a block diagram illustrating an example of a second emission driving circuit included in the dual display of FIG. 1.

FIG. 3A is a block diagram illustrating an example of a first emission driving circuit included in the dual display 100 of FIG. 1. FIG. 3B is a block diagram illustrating an example of a second emission driving circuit included in the dual display 100 of FIG. 1.

Referring to FIG. 3A, the first emission driving unit 112 includes first emission driving circuits 200 that generate the first emission control signal EMIT1 to be provided to the emission transistor TE of the first pixel Px1 through the first emission control line EML1. The first emission driving circuit 200 can operate based at least in part on a start signal FLM, a first clock signal CLK1, and a second clock signal CLK2. The first data driving unit 130 can provide the first emission driving unit control signal EMC1 that includes the start signal FLM, the first clock signal CLK1, and the second clock signal CLK2 to the first emission driving unit 112. The first emission driving circuit 200 can include first to third signal processors SP1 to SP3. The first signal processor SP1 can receive the start signal FLM and the first clock signal CLK1. The first signal processor SP1 can generate a first signal CS1 and a second signal CS2 based at least in part on the start signal FLM and the first clock signal CLK1. The first and second signals CS1 and CS2 can be provided to the second signal processor SP2. The second signal processor SP2 can generate a third signal CS3 and a fourth signal CS4 based at least in part on the second clock signal CLK2, the first signal CS1, and the second signal CS2. The third signal CS3 and the fourth signal CS4 can be provided to the third signal processor SP3. The third signal processor SP3 can receive a first voltage VGL and a second voltage VGH and generate the first emission control signal EMIT1 based at least in part on the third signal CS3 and the fourth signal CS4.

Referring to FIG. 3B, the second emission driving unit 122 includes the second emission driving circuits 250 that generate the second emission control signal EMIT2 to be provided to the emission transistor TE of the second pixel Px2 through the second emission control line EML2. The second emission driving circuit 250 can operate based at least in part on a start signal FLM, a first clock signal CLK1, and a second clock signal CLK2. The second data driving unit 140 can provide the second emission driving unit control signal EMC2 that includes the start signal FLM, the first clock signal CLK1, and the second clock signal CLK2 to the second driving unit 122. The second emission driving control signal EMC2 can include first to third signal processors SG1 to SG3. The first signal processor SG1 can receive the start signal FLM and the first clock signal CLK1. The first signal processor SG1 can generate a first signal CS1 and a second signal CS2 based at least in part on the start signal FLM and the first clock signal CLK1. The first signal CS1 and the second signal CS2 can be provided to the second signal processor SG2. The second signal processor SG2 can generate a third signal CS3 and a fourth signal CS4 based at least in part on the second clock signal CLK2, the first signal CS1, and the second signal CS2. The third signal CS3 and the fourth signal CS4 can be provided to the third signal processor SG3. The third signal processor SG3 can receive the first voltage VGL and the second voltage VGH and can generate the second emission control signal EMIT2 based at least in part on the third signal CS3 and the fourth signal CS4.

Although the first emission driving circuit 200 and the second emission driving circuit 250 that include P-channel metal oxide semiconductor (PMOS) transistor are described, the first emission driving circuit 200 and the second emission driving circuit 250 are not limited thereto. For example, the first and second emission driving circuits 200 and 250 include N-channel metal oxide semiconductor (NMOS) transistors.

Figure 4A:
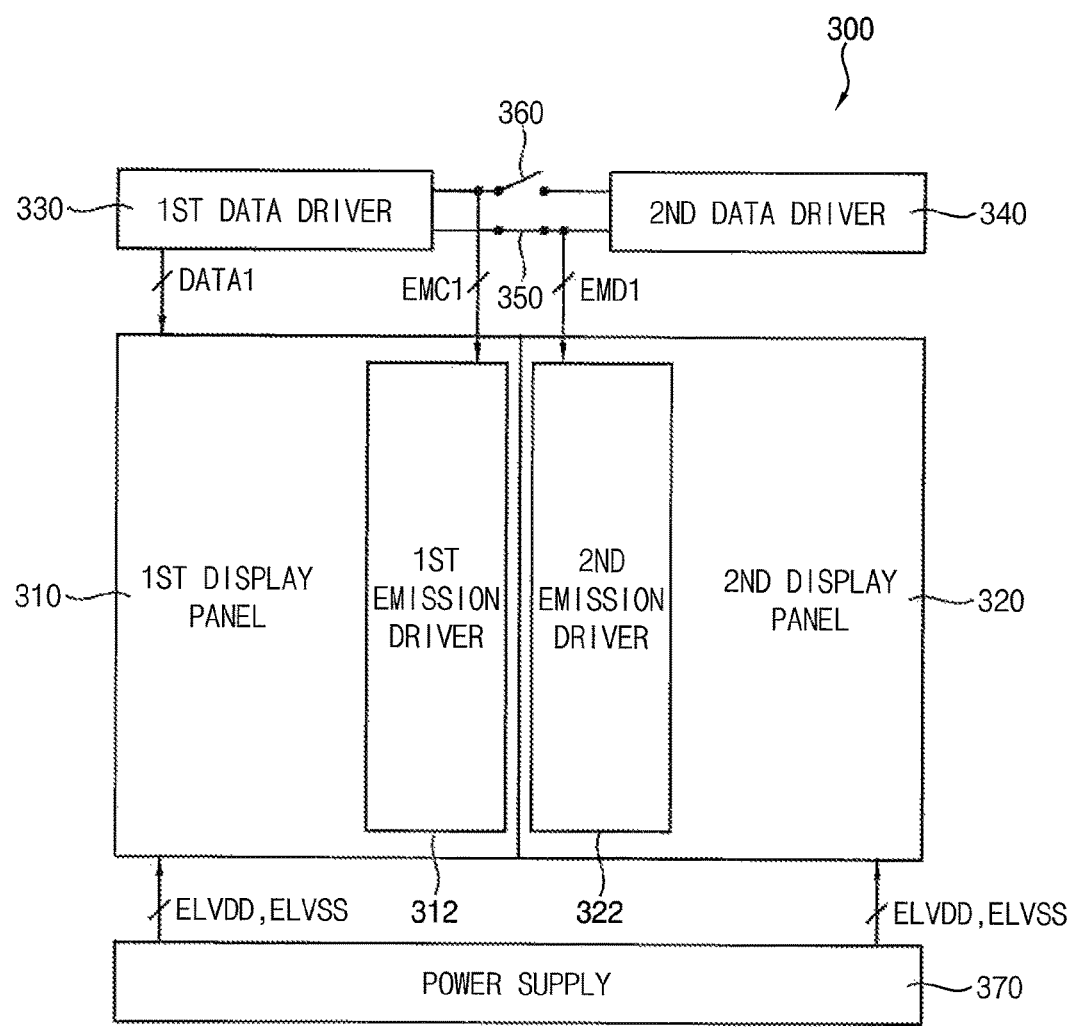
FIG. 4A is a block diagram illustrating an example of an operation of a first display panel included in the dual display of FIG. 1.

FIG. 4A is a block diagram illustrating an example of an operation of the first display panel 110 included in the dual display 100 of FIG. 1. FIG. 4B is a block diagram illustrating an example of an operation of the second display panel 120 included in the dual display 100 of FIG. 1.

Referring to FIG. 4A, a first display panel 310 operates based at least in part on a first data signal DATA1 and the first emission control signal that is generated by the first emission driving control signal EMC1. Here, the second data driving unit 340 does not operate at least when the first emission driver disable control signal EMD1 is transmitted. The power supply unit 370 can provide the high power voltage ELVDD and the low power voltage ELVSS to the first display panel 310 and a second display panel 320. Therefore, image defects can occur on the second display panel 320 of a typical dual display. However, a dual display 300 according to example embodiments can prevent the image defects from occurring on the second display panel 320 by turning on a first switch unit 350 and providing a first emission driving unit disable control signal EMD1 to the second emission driving unit 322 while the first display panel 310 operates. As illustrated in FIG. 4A, the first data driving unit 330 provides the first data signal DATA1 and the first data driving unit control signal EMC1 to the first display panel 310. The first emission driving unit 312 that receives the first data driving unit control signal EMC1 can generate the first emission control signal that controls the emission transistor of the first pixels of the first display panel 310. The first pixels of the first display panel 310 can emit light according to the first emission control signal. Further, the first data driving unit 330 can generate a first switch control signal that controls an operation of the first switch unit 350. The first switch unit 350 can turn on based at least in part on the first switch control signal. The first data driving unit 330 can provide the first emission driving unit disable control signal EMD1 to the second emission driving unit 322. The second emission driving unit 322 that receives the first emission driving unit disable control signal EMD1 can generate the second emission control signal EMIT2 that turns off the emission transistor of the second pixels of the second display panel 320. Thus, in some embodiments, the second pixels of the second display panel 320 do not emit light.

Referring to FIG. 4B, the second display panel 320 operates based at least in part on the second data signal DATA2 and the first emission control signal that is generated by the second emission driving unit control signal EMC2. Here, the first data driving unit 330 does not operate at least when the second emission driver disable control signal EMD2 is transmitted. The power supply unit 370 can provide the high power voltage ELVDD and the low power voltage ELVSS to the first and second display panels 310 and 320. Therefore, image defects can occur on the first display panel 310 of a typical dual display. However, the dual display 300 according to example embodiments prevents the image defects from occurring on the first display panel 310 by turning on a second switch unit 360 and providing a second emission driving unit disable control signal EMD2 to the first emission driving unit 312 while the second display panel 320 operates. As illustrated in FIG. 4B, the second data driving unit 340 provides the second data signal DATA2 and the second data driving unit control signal EMC2 to the second display panel 320. The second emission driving unit 322 that receives the second data driving unit control signal EMC2 can generate the second emission control signal that controls the emission transistor of the second pixels of the second display panel 320. The second pixels of the second display panel can emit light based at least in part on the second emission control signal. Further, the second data driving unit 340 can generate a second switch control signal that controls an operation of the second switch unit 360. The second switch unit 360 can turn on based at least in part on the second switch control signal. The second data driving unit 340 can provide the second emission driving unit disable control signal EMD2 to the first emission driving unit 312. The first emission driving unit 312 that receives the second emission driving unit disable control signal EMD2 can generate the first emission control signal EMIT1 that turns off the emission transistor of the first pixels of the first display panel 310. Thus, in some embodiments, the first pixels of the first display panel 310 do not emit light.

Figure 5A:
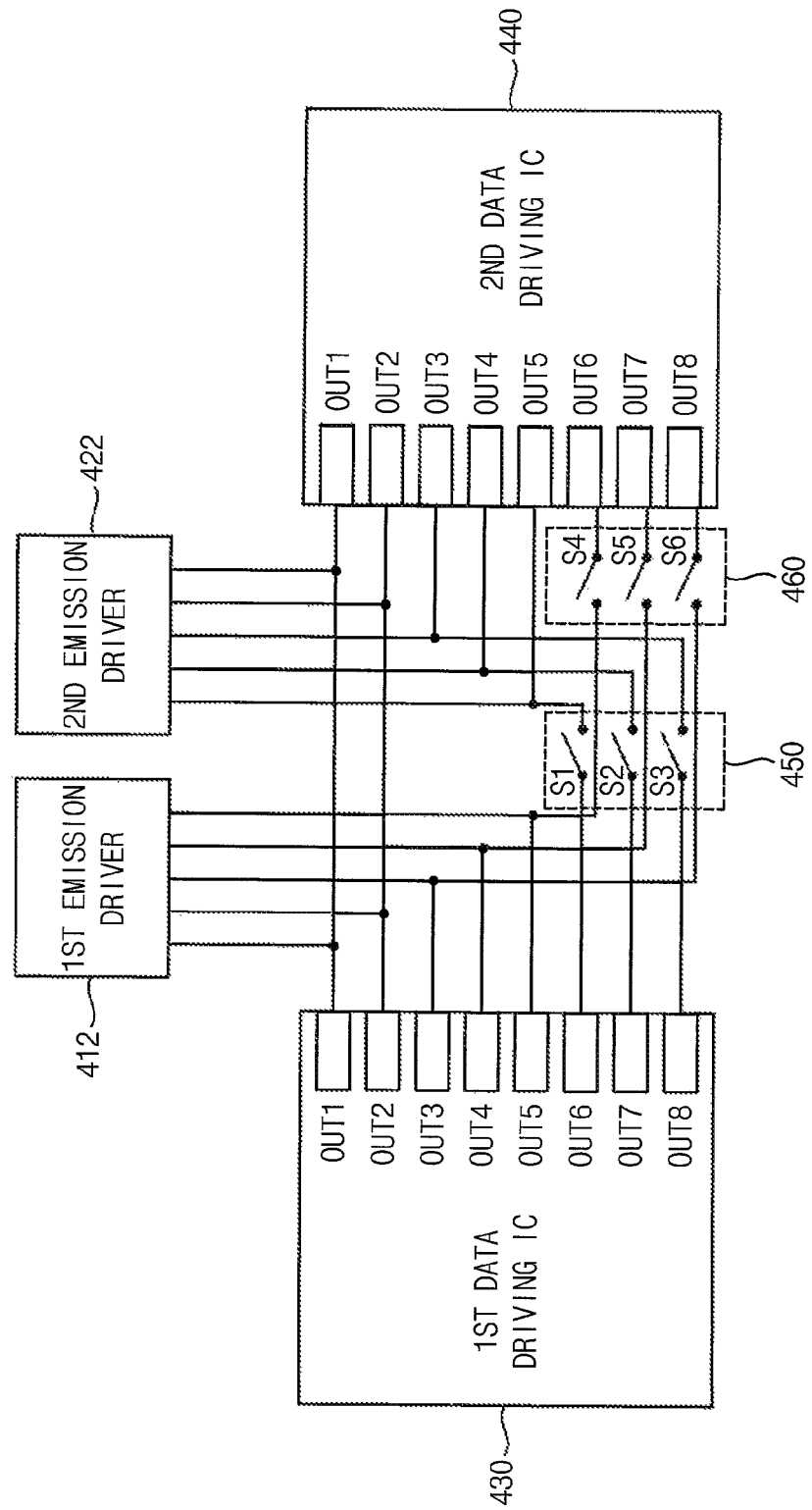
FIGS. 5A and 5B are diagrams illustrating examples of a first switch unit and a second switch unit included in the dual display of FIG. 1.
Figure 5B:
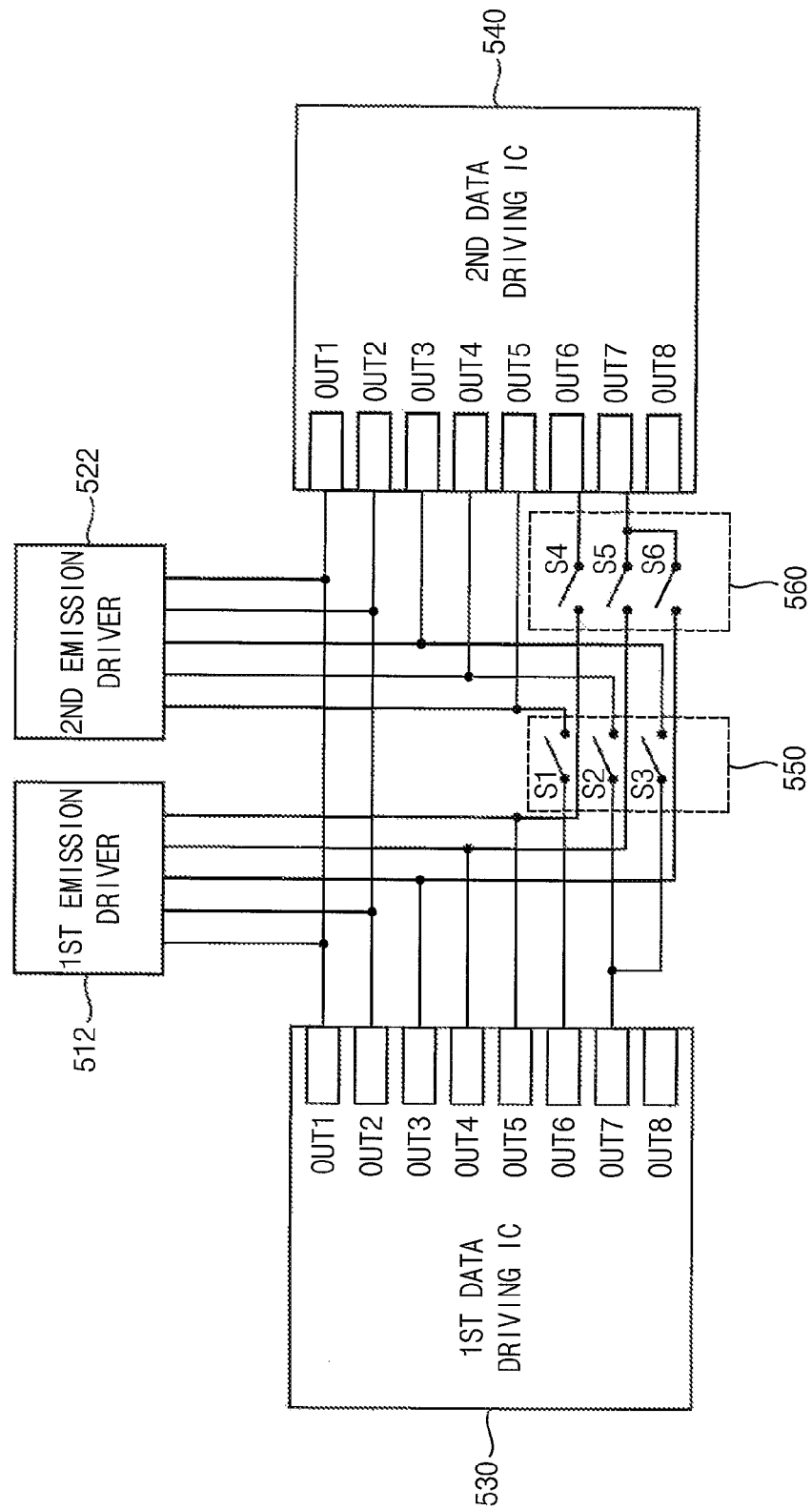

FIGS. 5A and 5B are diagrams illustrating examples of the first switch unit 150 and the second switch unit 160 included in the dual display 100 of FIG. 1.

Referring to FIG. 5A, a first switch unit 450 includes a first switch 51, a second switch S2, and a third switch S3. A second switch unit 460 can include a fourth switch S4, a fifth switch S5, and a sixth switch S6.

The first switch unit 450 can perform a coupling operation between a first data driving unit and a second emission driving unit 422. The first data driving unit can be implemented as a first data driving integrated circuit 430 that includes a plurality of output terminals. The first data driving integrated circuit 430 can include a first output terminal OUT1 that provides a first voltage to a first emission driving unit 412, a second output terminal OUT2 that provides a second voltage to the first emission driving unit 412, a third output terminal OUT3 that provides a start signal to the first emission driving unit 412, a fourth output terminal OUT4 that provides a first clock signal to the first emission driving unit 412, and a fifth output terminal OUT5 that provides a second clock signal to the first emission driving unit 412. The first data driving integrated circuit 430 can also include a sixth output terminal OUT6 electrically connected to the first switch S1, a seventh output terminal OUT7 electrically connected to the second switch S2, and a eighth output terminal OUT8 electrically connected to the third switch S3. The first emission driving unit 412 can include the first emission driving circuit 200 illustrated in FIG. 3A. Referring to FIG. 3A, the first emission driving circuit 200 generates the first emission control signal EMIT1 that controls the operation of the emission transistor of the first pixels based at least in part on the first voltage VGL, the second voltage VGH, the start signal FLM, the first clock signal CLK1, and the second clock signal CLK2 that are provided from the first data driving integrated circuit 430.

The first data driving integrated circuit 430 can provide the first voltage VGL, the second voltage VGH, the start signal FLM, the first clock signal CLK1, and the second clock signal CLK2 to the first emission driving unit 412 through the first through fifth output terminals OUT1 through OUT5.

Ends of the first through third switch 51 through S3 can be electrically connected to the first data driving integrated circuit 430, and another ends of the first through third switch S1 through S3 can be electrically connected to the second emission driving unit 422. The first switch 51, the second switch S2, and the third switch S3 of the first switch unit 450 can turn on while the first display panel operates based at least in part on the first data signal and the first emission control signal. The second emission driving unit 422 can include the second emission driving circuit 250 illustrated in FIG. 3B. Referring to FIG. 3B, the second emission driving circuit 250 generates the second emission control signal EMIT2 that turns off the emission transistor of the second pixels based at least in part on the first voltage VGL, the second voltage VGH, the start signal FLM, the first clock signal CLK1, and a second clock signal CLK2 provided from the first data driving integrated circuit 430 through the first through third switch S1 through S3. The first data driving integrated circuit 430 can provide the first voltage VGL and the second voltage VGH to the second emission driving unit 422 through the first output terminal OUT1 and the second output terminal OUT2. The first data driving integrated circuit 430 can also provide the start signal FLM, the first clock signal CLK1, and the second clock signal CLK2 to the second emission driving unit 422 through the sixth through eighth output terminals OUT6 through OUT8. In some embodiments, when a logic high level signal is output from the sixth output terminal OUT6 and a logic low level signal is output from the seventh and eighth output terminals OUT7 and OUT8, the second emission driving unit 422 generates the second emission control signal for controlling the emission transistor of the second pixels turns off. In some embodiments, when a logic low level signal is output from the sixth output terminal OUT6 and a logic high level signal is output from the seventh and eighth output terminals OUT7 and OUT8, the second emission driving unit 422 generates the second emission control signal for controlling the emission transistor of the second pixels turns off.

The second switch unit 460 can perform a coupling operation between the second data driving unit 422 and the first emission driving unit 412. The second data driving unit 422 can be implemented as a second data driving integrated circuit 440 that includes a plurality of output terminals. The second data driving integrated circuit 440 can include a first output terminal OUT1 that provides a first voltage to a second emission driving unit 422, a second output terminal OUT2 that provides a second voltage to the second emission driving unit 422, a third output terminal OUT3 that provides a start signal to the second emission driving unit 422, a fourth output terminal OUT4 that provides a first clock signal to the second emission driving unit 422, and a fifth output terminal OUT5 that provides a second clock signal to the second emission driving unit 422. The second data driving integrated circuit 440 can also include a sixth output terminal OUT6 electrically connected to the first switch S1 of the second switch unit 460, a seventh output terminal OUT7 electrically connected to the second switch S2 of the second switch unit 460, and a eighth output terminal OUT8 electrically connected to the third switch S3 of the second switch unit 460. The second emission driving unit 422 can include the second emission driving circuit 250 illustrated in FIG. 3B. Referring to FIG. 3B, the second emission driving circuit 250 generates the second emission control signal EMIT2 that controls the operation of the emission transistor of the second pixels based at least in part on the first voltage VGL, the second voltage VGH, the start signal FLM, the first clock signal CLK1, and the second clock signal CLK2 that are provided from the second data driving integrated circuit 440. The second data driving integrated circuit 440 can provide the first voltage VGL, the second voltage VGH, the start signal FLM, the first clock signal CLK1, and the second clock signal CLK2 to the second emission driving unit 422 through the first through fifth output terminal OUT1 through OUT5.

Ends of the fourth through sixth switch S4 through S6 can be electrically connected to the second data driving integrated circuit 440, and another ends of the fourth through sixth switch S4 through S6 can be electrically connected to the first emission driving unit 412. The fourth to sixth switches S1 to S3 of the second switch unit 460 can turn on while the second display panel operates based at least in part on the second data signal and the second emission control signal. The first emission driving unit 412 can include the first emission driving circuit 200 illustrated in FIG. 3A. Referring to FIG. 3A, the first emission driving circuit 200 generates the first emission control signal EMIT1 that turns off the emission transistor of the first pixels based at least in part on the first voltage VGL, the second voltage VGH, the start signal FLM, the first clock signal CLK1, and a second clock signal CLK2 provided from the second data driving integrated circuit 440 through the fourth through sixth switch S4 through S6. The second data driving integrated circuit 440 can provide the first voltage VGL and the second voltage VGH to the first emission driving unit 412 through the first output terminal OUT1 and the second output terminal OUT2, and provide the start signal FLM, the first clock signal CLK1, and the second clock signal CLK2 to the first emission driving unit 412 through the sixth through eighth output terminals OUT6 through OUT8. In some embodiments, when a logic high level signal is output from the sixth output terminal OUT6 and a logic low level signal is output from the seventh and eighth output terminals OUT7 and OUT8, the first emission driving unit 412 can generate the first emission control signal for controlling the emission transistor of the first pixels turns off. In some embodiments, when a logic low level signal is output from the sixth output terminal OUT6 and a logic high level signal is output from the seventh and eighth output terminals OUT7 and OUT8, the first emission driving unit 412 can generate the first emission control signal for controlling the emission transistor of the first pixels turns off.

Referring to FIG. 5B, a first switch unit 550 includes the first to third switches S1 to S3. A second switch unit 560 can include the fourth to sixth switches S4 to S6.

The first switch unit 550 of FIG. 5B can be substantially the same as the described referring to FIG. 5A except that the third switch S3 of the first switch unit 550 is electrically connected to the seventh output terminal OUT7 of the first data driving integrated circuit 530. The seventh and eighth output terminals OUT7 and OUT8 can output substantially the same level of voltage. The first and second clock signals CLK1 and CLK2 of the first emission driving unit disable control signal can have substantially the same level. Thus, when the first display panel operates, the second switch S2 and the third switch S3 can be electrically connected to the seventh output terminal OUT7 and provide the first and second clock signals CKL1 and CKL2 to the second emission driving unit 522. The second and third switches S2 and S3 can be electrically connected to the eighth output terminal OUT8 although an example that the second switch S2 and the third switch S3 can be electrically connected to the seventh output terminal OUT7 is illustrated in FIG. 5B.

The second switch unit 560 of FIG. 5B can be substantially the same as the one described referring to FIG. 5A except that the sixth switch S6 is electrically connected to the seventh output terminal OUT7. The seventh and eighth output terminals OUT7 and OUT8 can output substantially the same level of voltage. The first and second clock signals CLK1 and CLK2 of the second emission driving unit disable control signal can have substantially the same level. Thus, when the second display panel operates, the fifth and sixth switches S5 and S6 can be electrically connected to the seventh output terminal OUT7 and provide the first and second clock signals CLK1 and CLK2 to the first emission driving unit 512. The fifth and sixth switches S5 and S6 can be electrically connected to the eighth output terminal OUT8 although an example that the fifth switch S5 and the sixth switch S6 can be electrically connected to the seventh output terminal OUT7 is illustrated in FIG. 5B.

Figure 6:
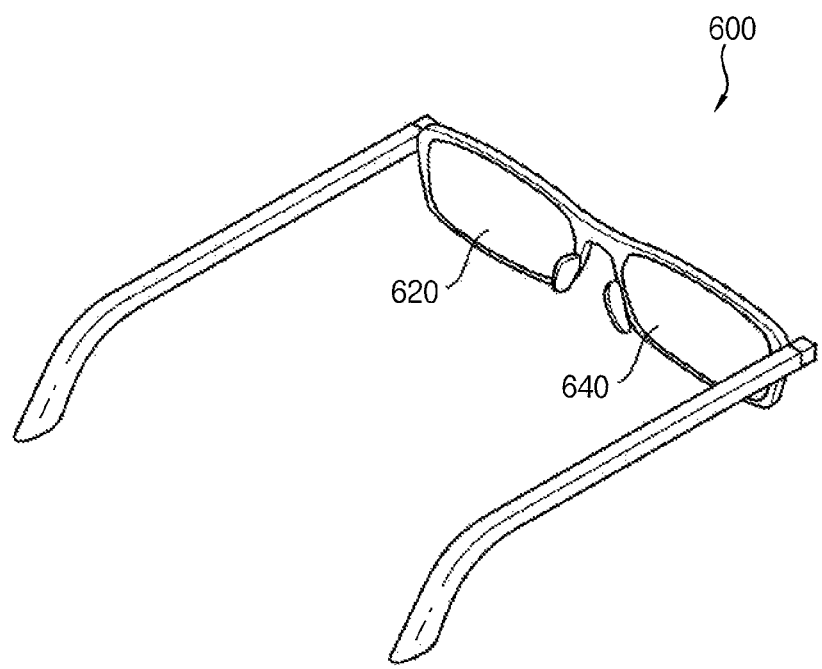
FIG. 6 is a diagram illustrating an example of the dual display of FIG. 1.

FIG. 6 is a diagram illustrating an example of the dual display 100 of FIG. 1.

Referring to FIG. 6, a head mount display (HMD) 600 includes a left-eye lens 620 and a right-eye lens 640.

The left-eye lens 620 can receive a first data signal and a first emission driving unit control signal that controls an operation of a first emission driving unit from a first data driving unit. The first emission driving unit can generate a first emission control signal that controls an emission operation of first pixels by electrically connecting to an emission transistor of the first pixels of the left-eye lens 620. Further, the right-eye lens 640 can receive a second data signal and a second emission driving unit control signal that controls an operation of a second emission driving unit from a second data driving unit. The second emission driving unit can generate a second emission control signal that controls an emission operation of second pixels by electrically connecting to the emission transistor of the second pixels of the right-eye lens 640.

The first data driving unit can provide a first emission driving unit disable control signal for controlling the second pixels of the right-eye lens 640 to not emit light to a second emission driving unit of the right-eye lens 640 while the left-eye lens 620 is operating based at least in part on the first data signal and the first emission control signal. Thus, the head mount display 600 can prevent the image defects from occurring on the right-eye lens 640 when the left-eye lens 620 is operating. The second data driving unit can provide a second emission driving unit disable control signal for controlling the first pixels of the left-eye lens 620 to not emit light to a first emission driving unit of the left-eye lens 620 while the right-eye lens 640 is operating based at least in part on the second data signal and the second emission control signal. Thus, the head mount display 600 can prevent the image defects from occurring on the left-eye lens 620 when the right-eye lens 640 is operating.

Figure 7:
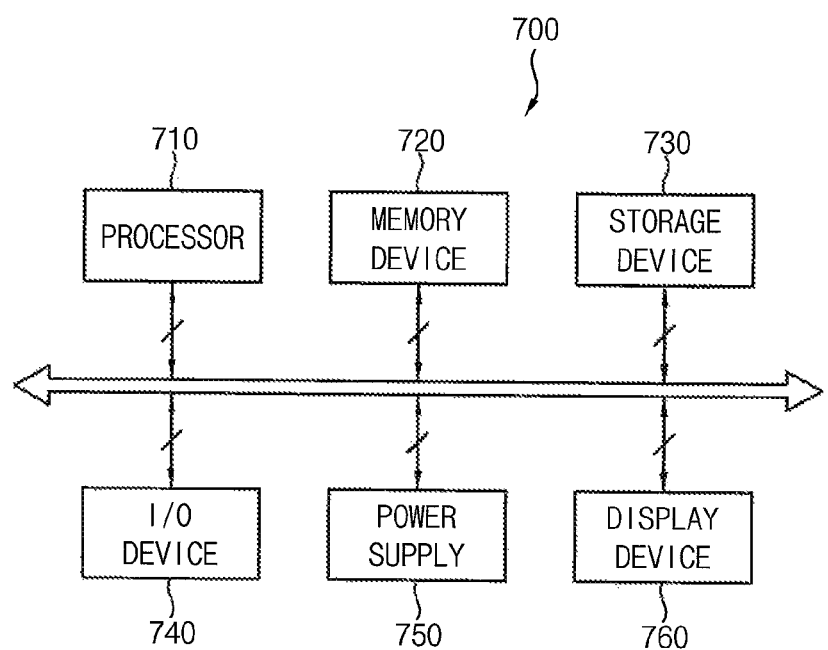
FIG. 7 is a block diagram illustrating an electronic according to example embodiments.
Figure 8:
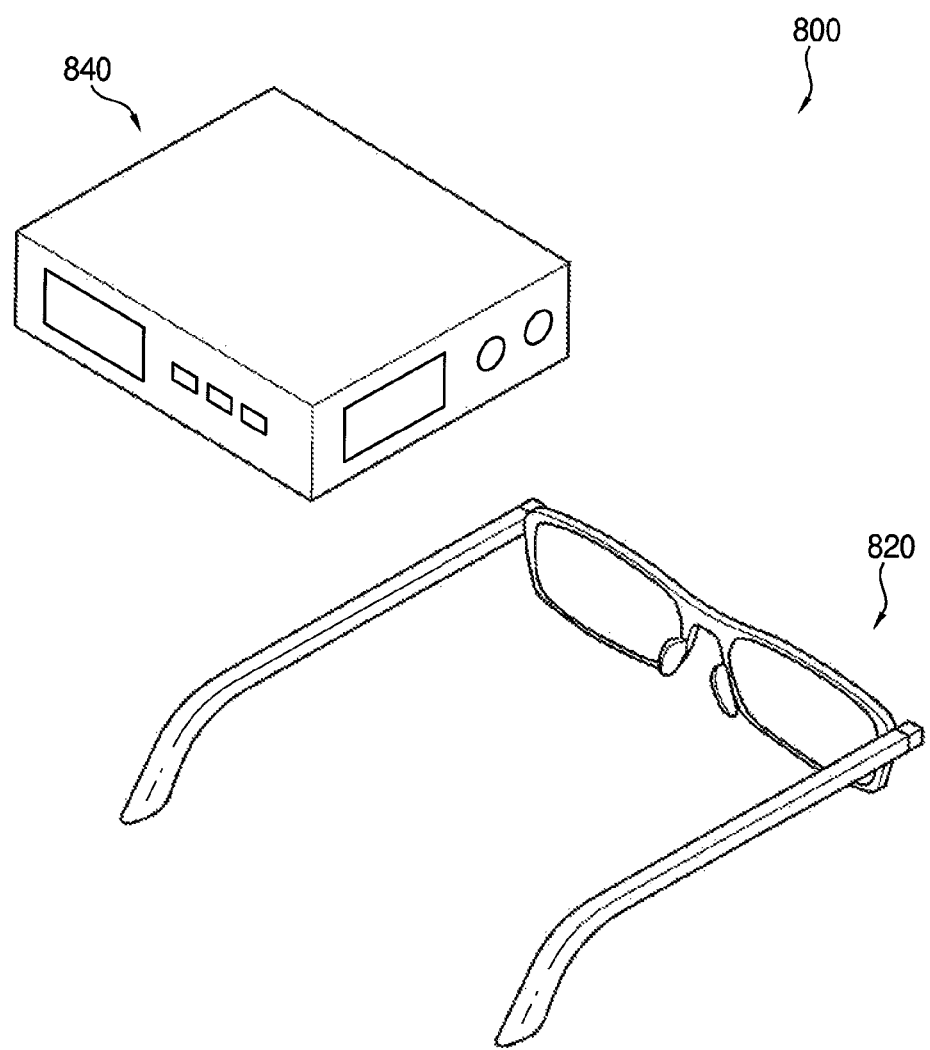
FIG. 8 is a diagram illustrating an example of the electronic of FIG. 7.

FIG. 7 is a block diagram illustrating an electronic device according to example embodiments. FIG. 8 is a diagram illustrating an example of the electronic device of FIG. 7.

Referring to FIGS. 7 and 8, an electronic device 700 includes a processor 710, a memory device 720, a storage device 730, an input/output (I/O) device 740, a power supply 750, and a display device 760. Here, the display device 760 can correspond to the dual display 100 of FIG. 1. In addition, the electronic device 700 can further include a plurality of ports for communicating a video card, a sound card, a memory card, a universal serial bus (USB) device, other electronic device, etc. For example, an electronic device 800 (see FIG. 8) can include a head mount display 820 and a terminal device 840 that controls an operation of the head mount display 820 as illustrated in the dual display in FIG. 8.

The processor 710 can perform various computing functions. The processor 710 can be a microprocessor, a central processing unit (CPU), etc. The processor 710 can be electrically connected to other components via an address bus, a control bus, a data bus, etc. Further, the processor 710 can be electrically connected to an extended bus such as peripheral component interconnect (PCI) bus. The memory device 720 can store data for operations of the electronic device 700. For example, the memory device 720 can include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc. The storage device 730 can include a solid state drive (SSD) device, a hard disk drive (HDD) device, a CD-ROM device, etc.

The I/O device 740 can be an input device such as a keyboard, a keypad, a touchpad, a touch-screen, a mouse, etc, and an output device such as a printer, a speaker, etc. In some embodiments, the display device 760 is included in the I/O device 740. The power supply 750 can provide a power for operations of the electronic device 700. The display device 760 can communicate with other components via the buses or other communication links. The display device 760 corresponds to the dual display 100 and the power supply corresponds to the power supply 170. Therefore, duplicate descriptions will be omitted.

The described technology can be applied to an electronic device having a display device. For example, the described technology be applied to computer monitors, laptop computers, digital cameras, cellular phones, smartphones, smart pads, televisions, personal digital assistants (PDAs), portable multimedia players (PMPs), MP3 players, navigation systems, game consoles, video phones, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive technology. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A dual display comprising:
    a first display panel including a plurality of first pixels and a first emission driving circuit configured to transmit a plurality of first emission control signals to the first pixels;
    a second display panel including a plurality of second pixels and a second emission driving circuit configured to transmit a plurality of second emission control signals to the second pixels, wherein the second display panel is adjacent to the first display panel;
    a first data driver configured to i) transmit a first data signal to the first display panel, ii) transmit a first emission driving circuit control signal to the first emission driving circuit to control the first emission driving circuit, and iii) transmit a first emission driving circuit disable control signal to the second emission driving circuit to control the second pixels to not emit light;
    a second data driver configured to i) transmit a second data signal to the second display panel, ii) transmit a second emission driving circuit control signal to the second emission driving circuit for controlling the second emission driver, and iii) transmit a second emission driving circuit disable control signal to the first emission driving circuit to control the first pixels to not emit light;
    a first switch directly connected to the first emission driving circuit and configured to electrically connect the first emission driving circuit to the second data driver;
    a second switch directly connected to the second emission driving circuit and configured to electrically connect the second emission driving circuit to the first data driver; and
    a power supply configured to provide first and second power voltages different from each other to both of the first and second display panels,
    wherein the second data driver is further configured to not operate when the first emission driving circuit disable control signal is transmitted to the second emission driving circuit, and wherein the first data driver is further configured to not operate when the second emission driving circuit disable control signal is transmitted to the first emission driving circuit.

2. The device of claim 1, wherein the first switch is configured to be turned on while the first display panel is operating based at least in part on the first data signal and the first emission control signal so as to transfer the first emission driving circuit disable control signal to the second emission driving circuit.

3. The device of claim 1, wherein the second switch is configured to be turned on while the second display panel is operating based at least in part on the second data signal and the second emission control signal so as to transfer the second emission driving circuit disable control signal to the first emission driving circuit.

4. The device of claim 1, wherein the first data driver is further configured to output a first switch control signal to control the first switch.

5. The device of claim 1, wherein the second data driver is further configured to output a second switch control signal to control the second switch.

6. The device of claim 1, wherein each of the first pixels includes:
    an organic light-emitting diode (OLED);
    a pixel circuit configured to generate a driving current flowing through the OLED; and
    an emission transistor configured to control the OLED based at least in part on the first emission control signal transmitted through an emission control line, wherein the emission transistor is formed between the OLED and the pixel circuit.

7. The device of claim 6, wherein the first emission driving circuit is configured to transmit the first emission control signal to the emission transistor through the emission control line.

8. The device of claim 1, wherein each of the second pixels includes:
    an OLED;
    a pixel circuit configured to generate a driving current flowing through the OLED; and
    an emission transistor configured to control the OLED based at least in part on the second emission control signal transmitted through an emission control line, wherein the emission transistor is formed between the OLED and the pixel circuit.

9. The device of claim 8, wherein the second emission driving circuit is configured to transmit the second emission control signal to the emission transistor through the emission control line.

10. The device of claim 1, wherein the dual display includes a head mount display (HMD).

11. The device of claim 10, wherein the HMD includes a left-eye lens and a right-eye lens.

12. An electronic device comprising a dual display and a processor configured to control the dual display, wherein the dual display includes:
    a first display panel including a plurality of first pixels and a first emission driving circuit configured to transmit a plurality of first emission control signals to the first pixels;
    a second display panel including a plurality of second pixels and a second emission driving circuit configured to transmit a plurality of second emission control signals to the second pixels, wherein the second display panel is adjacent to the first display panel;
    a first data driver configured to i) transmit a first data signal to the first display panel, ii) transmit a first emission driving circuit control signal to the first emission driving circuit to control the first emission driving circuit, and iii) transmit a first emission driving circuit disable control signal to the second emission driving circuit to control the second pixels to not emit light;
    a second data driver configured to i) transmit a second data signal to the second display panel, ii) transmit a second emission driving circuit control signal to the second emission driving circuit for controlling the second emission driver, and iii) transmit a second emission driving circuit disable control signal to the first emission driving circuit to control the first pixels to not emit light;
    a first switch directly connected to the first emission driving circuit and configured to electrically connect the first emission driving circuit to the second data driver;
    a second switch directly connected to the second emission driving circuit and configured to electrically connect the second emission driving circuit to the first data driver; and
    a power supply configured to provide first and second power voltages different from each other to both of the first and second display panels,
    wherein the second data driver is further configured to not operate when the first emission driving circuit disable control signal is transmitted to the second emission driving circuit, and wherein the first data driver is further configured to not operate when the second emission driving circuit disable control signal is transmitted to the first emission driving circuit.

13. The device of claim 12, wherein the first switch is configured to be turned on while the first display panel is operating based at least in part on the first data signal and the first emission control signal so as to transfer the first emission driving circuit disable control signal to the second emission driving circuit.

14. The device of claim 12, wherein the second switch is configured to be turned on while the second display panel is operating based at least in part on the second data signal and the second emission control signal so as to transfer the second emission driving circuit disable control signal to the first emission driving circuit.

15. The device of claim 12, wherein each of the first pixels includes:
an organic light-emitting diode (OLED);
a pixel circuit configured to generate a driving current flowing through the OLED; and
an emission transistor configured to control the OLED based at least in part on the first emission control signal transmitted through an emission control line, wherein the emission transistor is formed between the OLED and the pixel circuit.

16. The device of claim 15, wherein the first emission driving circuit is configured to transmit the first emission control signal to the emission transistor through the emission control line.

17. The device of claim 12, wherein each of the second pixels includes:
an OLED;
a pixel circuit configured to generate a driving current flowing through the OLED; and
an emission transistor configured to control the OLED based at least in part on the second emission control signal transmitted through an emission control line, wherein the emission transistor is formed between the OLED and the pixel circuit.

18. The device of claim 17, wherein the second emission driving circuit is configured to transmit the second emission control signal to the emission transistor through the emission control line.

19. The device of claim 12, wherein the dual display includes a head mount display (HMD) device.

20. The device of claim 19, wherein the HMD includes a left-eye lens and a right-eye lens.

* * * * *